(12) United States Patent  
Maupin et al.

(10) Patent No.: US 11,957,150 B2  
(45) Date of Patent: Apr. 16, 2024

(54) ROTARY DRUM SKINSHEET CLAMP

(71) Applicant: Lyco Manufacturing Inc., Columbus, WI (US)

(72) Inventors: Daniel D. Maupin, Corvallis, OR (US); Steven J. Schultz, Beaver Dam, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 648 days.

(21) Appl. No.: 17/030,246

(22) Filed: Sep. 23, 2020

(65) Prior Publication Data

US 2021/0084959 A1 Mar. 25, 2021

Related U.S. Application Data

(60) Provisional application No. 62/904,533, filed on Sep. 23, 2019.

(51) Int. Cl.

| | |
|---|---|
| *A23N 12/04* | (2006.01) |
| *A23B 7/06* | (2006.01) |
| *A23L 5/10* | (2016.01) |
| *A47J 27/00* | (2006.01) |

(52) U.S. Cl.  
CPC ................ *A23N 12/04* (2013.01); *A23B 7/06* (2013.01); *A23L 5/13* (2016.08); *A47J 27/002* (2013.01); *A23V 2002/00* (2013.01)

(58) Field of Classification Search  
CPC ... A23L 5/13; A23B 7/06; A23N 12/04; A47J 27/002

See application file for complete search history.

(56) References Cited

U.S. PATENT DOCUMENTS

| | | | |
|---|---|---|---|
| 5,329,842 A | 7/1994 | Zittel | |
| 5,669,288 A | * 9/1997 | Zittel | .................. A23N 12/04 |
| | | | 99/360 |
| 5,692,569 A | * 12/1997 | Constantino | ............ A01L 3/00 |
| | | | 168/17 |
| 6,095,035 A | 8/2000 | Zittel et al. | |
| 6,105,485 A | 8/2000 | Zittel | |
| 6,205,913 B1 | 3/2001 | Zittel et al. | |
| 6,263,785 B1 | 7/2001 | Zittel | |
| 7,168,846 B1 | 1/2007 | Maupin | |
| RE40,232 E | 4/2008 | Zittel et al. | |

(Continued)

*Primary Examiner* — Thien S Tran  
(74) *Attorney, Agent, or Firm* — George R. Corrigan

(57) ABSTRACT

A rotary drum blancher/cooler for processing food includes a skinsheet comprised of a plurality of sections, clamps, and structural channels. Each clamp has clamping and release positions, and includes a base, a bail connected to the base, a draw connected to the bail, and at least a portion of a skinsheet clamp bar connected to the draw. The sections are disposed between structural channels, such that the drum is defined by the skinsheet sections alternating with the structural channels. The base is attached to a structural channel, and the draw extends from within to outside the structural channel. The skinsheet clamp bar is outside the structural channel. When the clamp is in the clamping position the clamp bar holds a skinsheet section to the structural channel in an operating position. When the clamp is in the release position configuration the clamp bar allows skinsheet section to move away from the structural channel in cleaning position.

18 Claims, 4 Drawing Sheets

(56) References Cited

U.S. PATENT DOCUMENTS

| | | |
|---|---|---|
| 7,500,426 B2 | 3/2009 | Zittel et al. |
| RE42,732 E | 9/2011 | Zittel et al. |
| 8,739,691 B2 | 6/2014 | Zittel et al. |
| 8,800,435 B2 | 8/2014 | Maupin et al. |
| 9,452,899 B2 | 1/2016 | Stousland et al. |
| 2017/0196252 A1 | 7/2017 | Maupin et al. |

* cited by examiner

ROTARY DRUM SKINSHEET CLAMP

FIELD OF THE INVENTION

The present disclosure relates generally to the art of rotary drum blancher/coolers. More specifically, it relates to rotary drum blancher/coolers with skinsheets attached thereto.

BACKGROUND OF THE INVENTION

Rotary drum blanchers are well known for gently handling food product. One example of a rotary drum blancher is found US in U.S. Pat. No. 5,669,288, which is hereby incorporated by reference. Other rotary drum blanchers may be found in U.S. Pat. No. 9,452,899, entitled Transfer mechanism for use with a food processing system; U.S. Pat. No. 8,800,435, entitled Rotary screw blancher with fluid passage and fluid agitation; U.S. Pat. No. 8,739,691, entitled Rotary screw blancher; RE42,732, entitled Rotary blancher for processing food product; U.S. Pat. No. 5,329,842, entitled Combination blancher and cooler; U.S. Pat. No. 6,095,035, entitled Dual drum food processor; U.S. Pat. No. 6,105,485, entitled Pressurized rotary blancher; U.S. Pat. No. 6,263,785, entitled Blancher and method of operation; U.S. Pat. No. 7,500,426, entitled Rotary cooker and cooler with improved product transfer mechanism; RE40,232, entitled Method for processing food product; U.S. Pat. No. 7,168,846, entitled Rotary processing device; and U.S. Pat. No. 6,205,913, entitled Rotary drum blancher for cooking food include, each of which are also hereby incorporated by reference.

Rotary blanchers generally include skinsheets which define the rotary drum in which blanching/cooling occurs. Rotary Drum Blanchers/coolers use skinsheets to contain the product within the center of the cylinder during processing, and to maintain the integrity of the cylinder structure. Skinsheet tightness is an important part of both of these functions. Skinsheet, as used herein, refers to the skin forming the drum.

Many prior art rotary blanchers/coolers have bolted-on skinsheets which create a very tight strong cylinder, but have overlapping areas that are difficult to clean. The skinsheet has sections that collectively define the drum, but each individually defines only part of the drum. Sections typically extend circumferentially—for example six sections might each extend slightly more than 30 degrees each, so that with overlapping they extend the entire circumference (360 degrees). Other designs have more than skinsheets and channels forming the drum, For example, one design provides for a skinsheet section adjacent a structural channel, and includes removable doors for additional cleaning access between pairs of adjacent skinsheet/channels. In such a design the skinsheets and adjacent channels for part of the drum, and the removable doors form part of the drum.

Prior art from the owner of this invention includes coreless cylinders, removable cleaning doors, CIP (Clean-in-place) skinsheet clamps, and totally removable skinsheets. All of these features add cleanability, but can slightly compromise the strength of the cylinder structure.

Totally removable skinsheets give full cleaning access, but can be cumbersome to remove, store, clean, and install exactly in the same location. The skinsheet sections are unbolted and each section removed. Totally removable skinsheets with clamps have also been used, but offer less tightening capability. Totally removable clamp, as used herein, refers to a clamp that allows the skinsheet to be totally removed when the clamp is opened (also referred to as disengaged).

The owner of this invention, LYCO Manufacturing, developed CIP (clean in place) skinsheets which opens up overlapping sections by separating sections, but the sections are not removed. These skinsheets were an improvement over other prior art skinsheets, because they were easier to clean. LYCO prior art CIP (clean in place) skinsheet clamps have similar strength of bolted skinsheets, but allow the ability to loosen up during cleaning. See U.S. patent application Ser. No. 15/403,701, published as US2017-0196252, and incorporated by reference.

Clean in place skinsheets use clamps to hold the skinsheet in place. However, CIP systems can have disadvantages, such as the durability of the clamp, ease of opening of the clamp, clearance of the clamp while rotating and still missing other components in the machine, loosening of the clamp over time, and the inability of the clamp to open up the interface between the cylinder's structural channels and the skinsheet. Clean in place clamp, as used herein, refers to a clamp that allows the skinsheet to be cleaned in place when the clamp is opened (also referred to as disengaged).

Prior art clamps often had insufficient size and force to be easily adjusted, maintain that tightness over time, and have sufficient tension to keep the skinsheets tight against the structural channels. Longevity and strength of the entire blancher/cooler cylinder is dependent on the tightness of the skinsheets. Insufficient tension on the skinsheets will cause excessive stress within the cylinder when turned and loaded with product.

Accordingly, a skinsheet clamp that is durable, easy to open, provides clearance while operating, does not loosen over time, and opens (allows access to) the interface between the cylinder's structural channels and the skinsheet is desired.

SUMMARY OF THE PRESENT INVENTION

According to a first aspect of the disclosure a rotary drum blancher/cooler for processing food includes a skinsheet comprised of a plurality of sections, a plurality of clamps, and a plurality of structural channels. Each clamp has clamping position and a release position. Each clamp includes a clamp base, a bail connected to the clamp base, a draw connected to the bail, and at least a portion of a skinsheet clamp bar through which the draw extends. The skinsheet sections are disposed adjacent corresponding structural channels, such that the drum is at least partially defined by the skinsheet sections adjacent structural channels. The base of each clamp is attached to a respective structural channels, and the draw extends from within structural channel to outside the structural channel. The skinsheet clamp bar is outside the structural channel. When the clamp is in the clamping position the at least a portion of the skinsheet clamp bar holds a skinsheet section to the structural channel in an operating position. When the clamp is in the release position configuration the at least a portion of the skinsheet clamp bar allows skinsheet section to move away from the structural channel in cleaning position.

According to a second aspect of the disclosure a clamp for a rotary drum blancher/cooler is described. The rotary drum is for processing food, and has a drum at least partially comprised of a skinsheet made of a plurality of sections and a plurality of structural channels. Each skinsheet section is disposed adjacent at least one structural channel such that the drum is at least partially defined by adjacent skinsheet sections and structural channels. Adjacent skinsheet sections and structural channels are held together by the clamp. The clamp includes a clamp base, a bail, a draw and at least a portion of a skinsheet clamp bar through which the draw extends. The clamp base is attached to a structural channel. The bail is connected to the clamp base. The draw is connected to the bail, and the draw extends from within the structural channel to outside the structural channel. The draw extends through the at least a portion of the skinsheet clamp bar, and the skinsheet clamp bar is disposed outside the of structural channel such that when the clamp is in a clamping position configuration the at least a portion of the skinsheet clamp bar holds the skinsheet section to the structural channel in an operating position, and when the clamp is in a release positions the at least a portion of the skinsheet clamp bar allows the respective skinsheet section to move away from the structural channel in cleaning position.

The bail is connected to the base using at least two linkage pins, and the bail has a first position that places the clamp in the clamping positions and a second position that places the clamp in the release position, in various embodiments.

The bail may be moved between the first position and the second position without the use of a wrench in one alternative.

The draw is connected to the bail using at least one pin, and when the bail is in the first position the draw extends outside of the structural channel a first distance, and when the bail is in the second position the draw extends outside of the structural channel a second distance, that is different from the first distance, in another alternative.

The draw extends through a hole in a side wall of the structural channel in one embodiment.

The skinsheets includes a side wall extending away from a surface of the drum in various embodiments, and the at least a portion of the skinsheet clamp bar holds the side wall to the structural channel when the clamp is in the clamping position The structural channels includes more than one clamp base attached thereto in one alternative.

The base is welded to the structural channels in another alternative.

The clamps are clean in place clamps and totally removable clamps in various alternatives.

Other principal features and advantages of will become apparent to those skilled in the art upon review of the following drawings, the detailed description and the appended claims.

Figure 1:
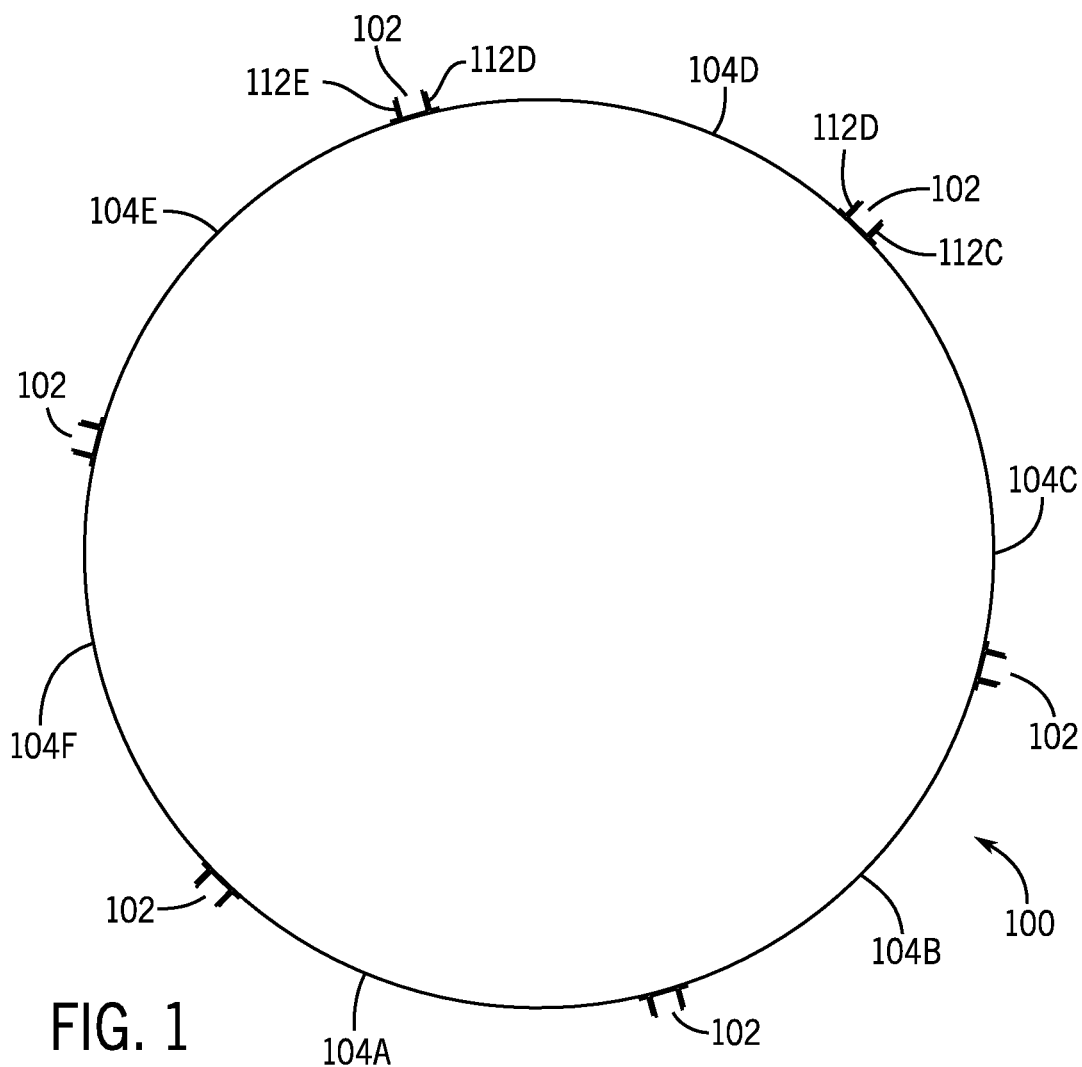
FIG. 1 is a cross section of a drum skinsheet.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular clamp and catch, it should be understood at the outset that other clamps and catches can be used to implement the invention, and that the clamps and catches can be used in other environments. The invention can be used with any rotary drum blancher/cooler.

This disclosure describes a clamp that can be used to hold a skinsheet to structural channels to form the drum of a blancher/cooler. Blancher/cooler, as used herein, refers to a device to blanch and/or cool product. Multiple sections (2, 3 4, 6, 8 or more in various embodiments) of the skinsheet for the drum. Collectively, the sections and structural channels extend the entire circumference (in the circumferential direction) of the drum. Individually each section extends less than the entire circumference of the drum. FIG. 1 shows a cross section of a drum 100 comprised of eight sections 104*a*-104*f*. Side walls 112 are at the edge of each section. Structural channels 102 alternate with the drum sections 104. Clamps are used to hold the side walls 112 of skinsheets 104 to the structural channels 102. Collectively the skinsheet sections and structural channels form the entire drum. Each section and adjacent channel of FIG. 1 combine to complete 60 degrees (⅙th of the circumference), although alternatives provide for sections of different sizes and a different number of sections. Another alternative provides for other components of the drum, such as removable doors. This design can have the channel adjacent a respective skinsheet section, and the door adjacent the channel.

Figure 2:
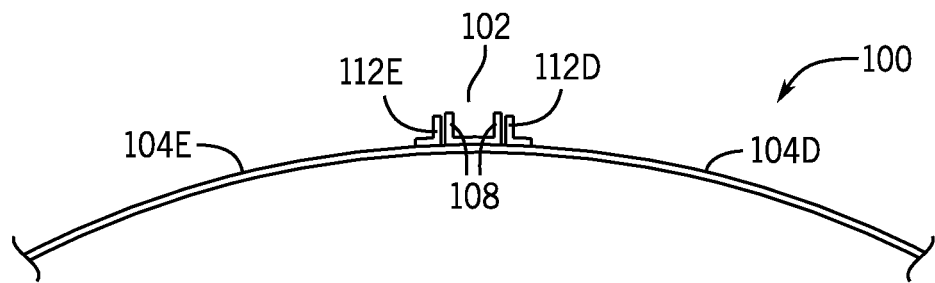
FIG. 2 is a portion of the cross section of the drum skinsheet of FIG. 1.

FIG. 2 shows a portion of drum 100, where skinsheet section 104*e* has side wall 112*e* adjacent a side wall 108 of structural channel 102. Side walls 112 and 107 extend away from the surface of the drum, although they could be more partially tangential Extending away from a surface of the drum, as used herein, refers to extending in a generally radial direction. Also, skinsheet section 104*d* has side wall 112*d* adjacent a side wall 108 of structural channel 102. The clamp described below holds side walls 112 tightly to side walls 108 (of structural channel 102) when in a clamping position. Clamping position, for a clamp, as used herein, refers to a position where the clamp holds adjacent sections (or other objects being clamped) together. Holds a skinsheet section to a structural channel, as used herein, refers to clamping the skinsheet tightly to the structural channel so that the drum can be used to operate and cool/blanch product. When the clamp is in the release position side walls 112 are allowed to move away from side walls 108 (of structural channel 102). Release position, for a clamp, as used herein, refers to a position where the clamp does not hold adjacent sections (or other objects being clamped) together. Allows a skinsheet sections to move away from the structural channel, as used herein, refers to releasing the skinsheet from the structural channel so that it may be cleaned (either by removing or cleaning in place).

The clamps are preferably a simple over-center clamp, and are used to hold skinsheets to structural channels. The clamp uses a draw (also referred to as a draw pin), pulled by a bail, that creates an offset clamping force using linkages and pins. In the preferred embodiment, the draw pin pulls against a skinsheet clamp bar when the clamp is in the clamping position or operating position. Skinsheet clamp bar, as used herein, refers to the portion of the clamp outside of the structural channel that moves to hold the skinsheet tightly to the structural channel, or allows the skinsheet to move away from the structural channel. A skinsheet clamp bar may be shared by more than one clamp, wherein a respective portion of the clamp bar is associated with and cooperates with each clamp. The clamp can be moved to a release position or cleaning position to allow for cleaning. Operating position, as used herein, refers to the skinsheet section being held tightly to the structural channel so that the drum can be used to cool/blanch product. Cleaning position, as used herein, refers to the skinsheet being distanced from the structural channel so that it may be cleaned (either by removing or cleaning in place).

Tightness can be adjusted using an adjustment nut (preferably self locking) when initially setting the tightness. Once tightness is set, the clamp can be moved from a clamping position to a release position without adjusting the nut. The nut tightness can be adjusted if it loosens.

The base of the clamp is located within the structural channel. Structural channel, as used herein, refers to the rigid channels that help define the structure of the drum. Within the structural channel, as used herein, refers to the area between opposing side walls of the structural channel, and can extend above the structural channel. The clamp preferably very compact, yet very heavy duty. The draw diameter is preferably ½" and is preferably 2-3× stronger than previous designs. The clamp moves the skinsheet away from the channel when it opens, allowing for easier access to this difficult to clean area. The preferred clamp design allows it to be made by laser cutting all the parts, with minimal machining required. It preferably can be opened using any device that slides over the bail, including the same wrench that adjusts the tension nut, or without a wrench at all (for example, using a pipe slid over the bail). Without the use of a wrench, as used herein, refers to being able to release or engage the clamp without using a wrench to turn a nut, screw, bolt, etc. It is compact enough that it does not require additional clearance or special features to miss other components in the rotary drum tank or cover.

Figure 3:
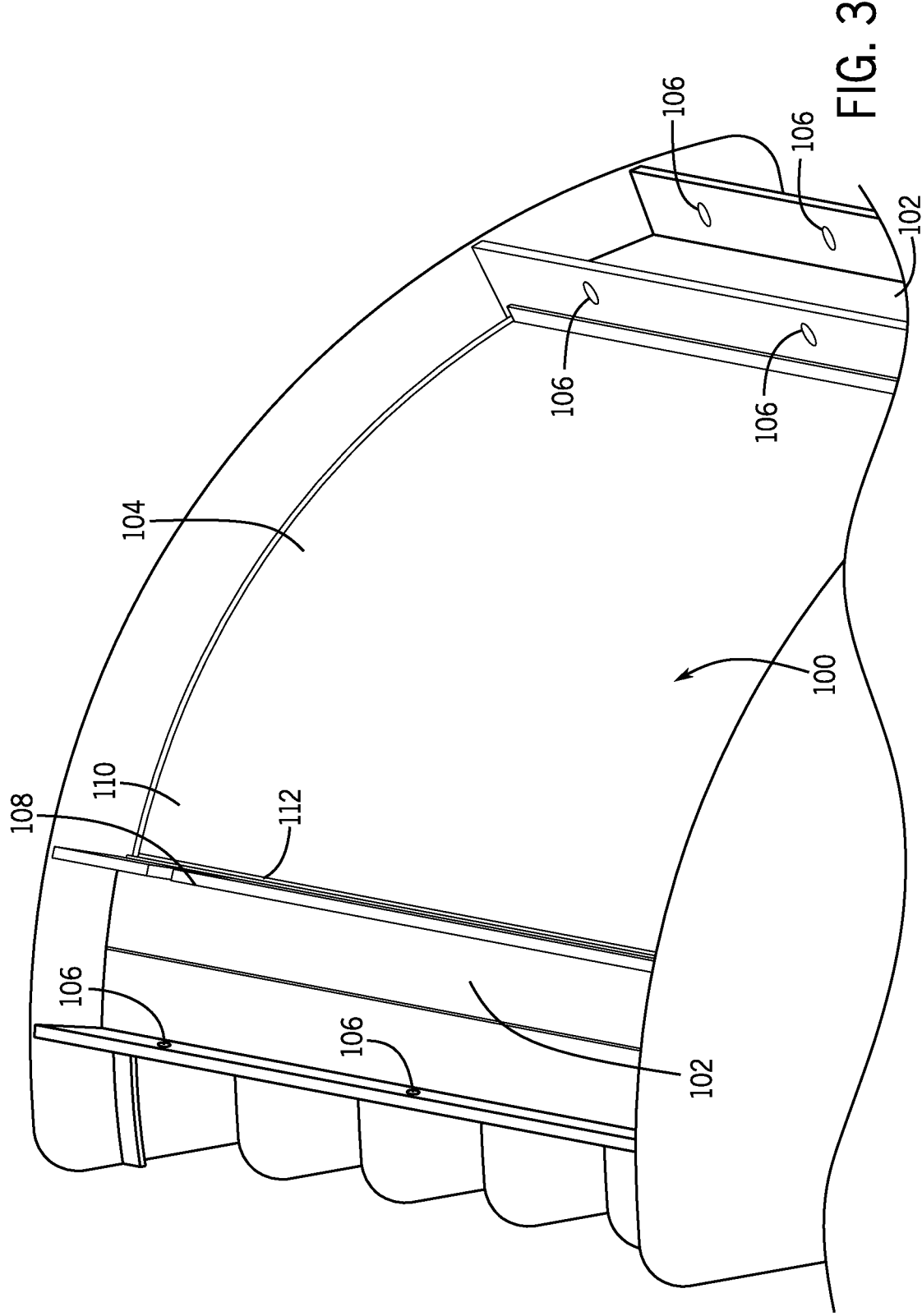
FIG. 3 is a portion of a drum with a skinsheet and structural channel.

FIG. 3 shows a portion of drum 100. Side walls 108 of structural channels 102 and skinsheet side walls 112 have holes 106 therein. The draw (pin) of the clamp passes through hole 106. Side wall, as used herein, refers to a part of a skinsheet or channel that extends in a generally radial direction, away from the circumference of the skinsheet or channel. A side wall need not be straight, and can be contoured. Hole in a side wall, as used herein, refers to an opening in the side wall that can be completely closed on its perimeter, or open on part of its perimeter.

Figure 4:
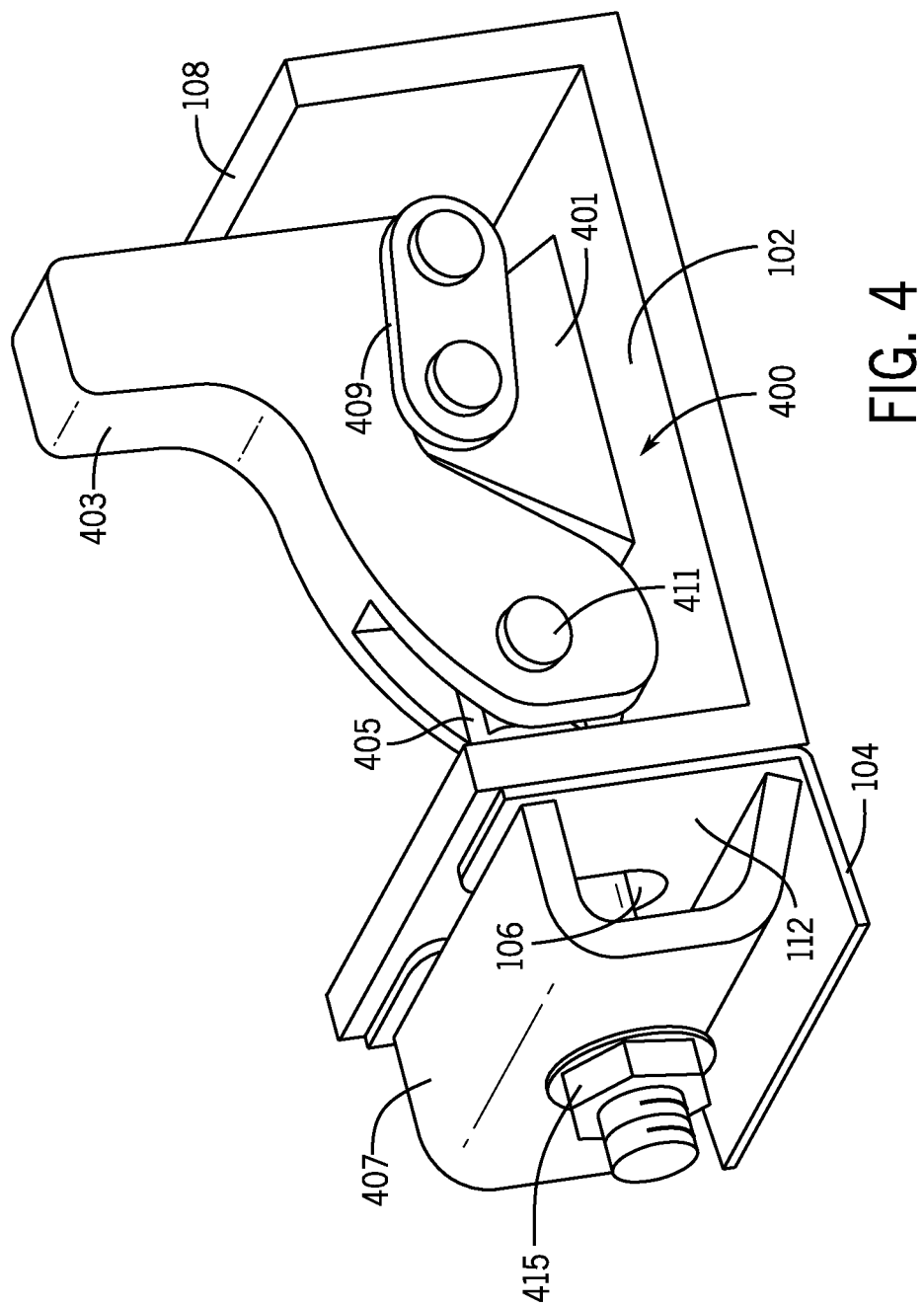
FIG. 4 is a clamp.

FIG. 4 shows a clamp 400, that includes a clamp base 401, a bail 403, a draw (or draw pin) 405, a skinsheet clamp bar 407, linkage pins 409, pin 411, and a nut 415. Base 401 is affixed to structural channel 102. Preferably, base 401 is welded to structural channel 102, but could be affixed by other means, such as by bolting them together. Welded, as used herein, refers to joining to affixing two components with melted metal.

Bail 403 is connected to base 401 using a pair of linkage pins 409. Linkage pins, as used herein, refers to pins that allow of one component relative to another. Linkage pins 409 allow bail 403 to pivot with respect to base 401. Draw 405 is connected to bale 403 using pin 411. The pivot motion of bale 403 is translated to motion of draw 405. The end of draw 405 near pin 411 is within the structural channel. Draw 405 passes through hole 106 and through skinsheet clamp bar 407. The end of draw 405 near skinsheet clamp bar 407 and nut 415 are outside of the structural channel. The preferred embodiment provides that skinsheet clamp bar 407 extends the entire width of the drum. If multiple clamps are used on a skinsheet/structural channel juncture, a single skinsheet clamp bar can be used for multiple clamps.

The end of draw 405 outside of structural channel 102 has skinsheet clamp bar 407 mounted thereon. Nut 415 holds skinsheet clamp bar 407 in place. Preferably, nut 415 is a self-locking nut. When bail 403 is moved to the clamping position (to the right on FIG. 4) draw 405 is drawn to the right, pulling skinsheet clamp bar 407 to the right, and holding side wall 112 tightly against side wall 108 in an operating position. During setup nut 415 is adjusted to the proper tightness. After setting nut 415 to the proper position the nut does not need to be adjusted unless it loosens. When bail 403 is moved to the release position (to the left on FIG. 4) draw 405 is pushed to the left, pushing skinsheet clamp bar 407 to the right, and allowing side wall 112 to move away from side wall 108, in a clean in place position. After setup nut 415 (when nut 415 is adjusted to the proper tightness) the clamp may be moved from clamping to release without the use of a wrench, simply by moving bail 403.

The preferred embodiment is for a clean in place clamp, which had hole 106 closed on the top on side wall 108. Alternatives provide for hole 106 to be open, and for clamp 400 to be a totally removable clamp. The preferred embodiment provide for a 48 inch wide drum, and for their to be three clamps in each structural channel on each side, for a total of 6 clamps per channel.

Figure 5:
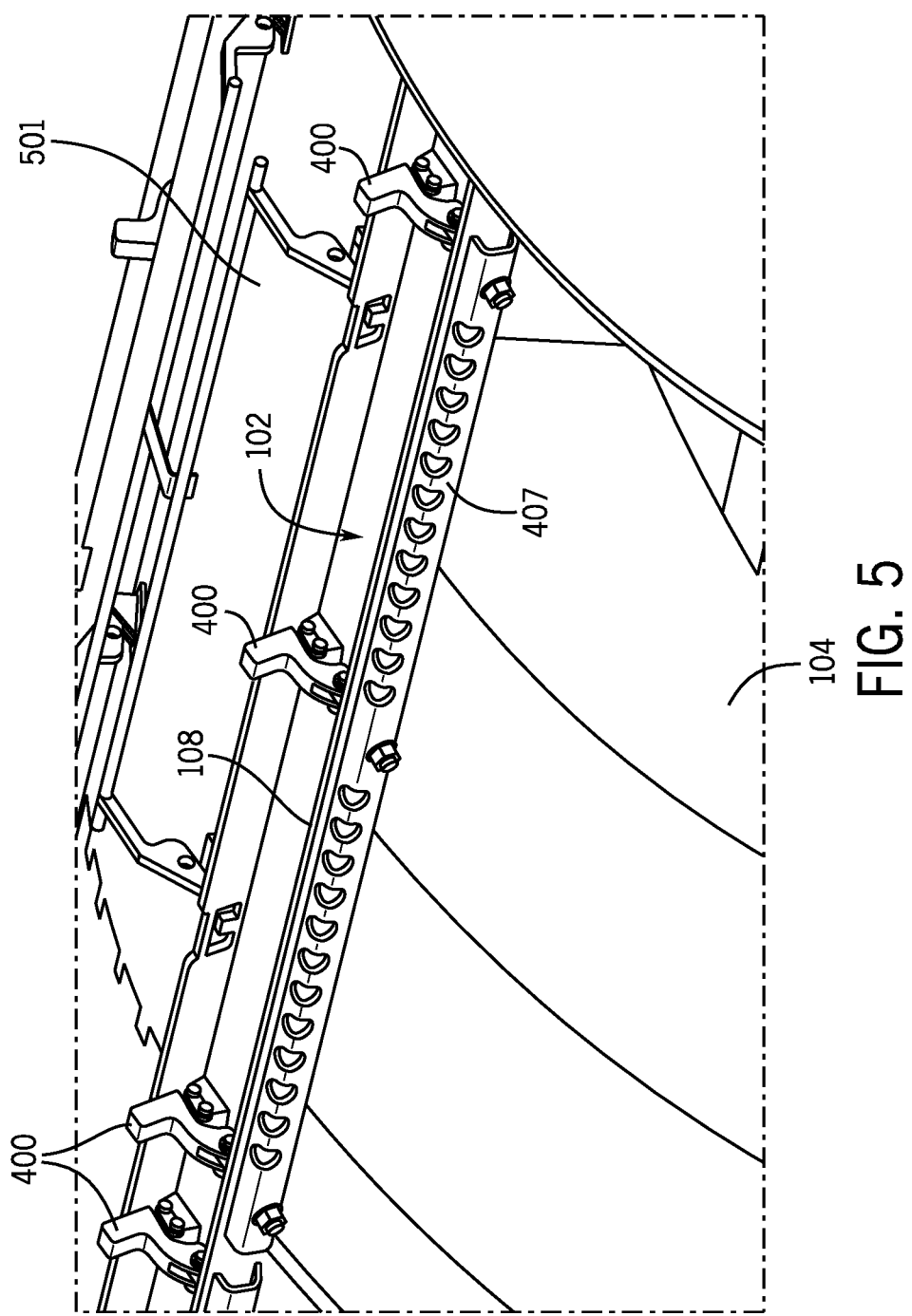
FIG. 5 is a portion of a drum with a skinsheet, structural channel and clamps/

FIG. 5 shows an alternative design with removable doors 501 for additional cleaning access. Skinsheet section 104 is adjacent structural channel 102. Clamp bar 407 extends the width of the drum. Clamps 400 are disposed in channel 102, and hold the skin sheet sidewall to channel sidewall 108.

Numerous modifications may be made to the present disclosure which still fall within the intended scope hereof Thus, it should be apparent that there has been provided a method and apparatus for a blancher/cooler that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A rotary drum blancher/cooler for processing food, comprising a drum, wherein the drum comprises:
   a skinsheet, comprised of a plurality of sections;
   a plurality of clamps having a clamping position and a release position, wherein each of the plurality of clamps includes a clamp base, a bail connected to the clamp base, a draw connected to the bail, and at least a portion of a skinsheet clamp bar, wherein the draw extends through the at least a portion of the skinsheet clamp bar;
   a plurality of structural channels, wherein each skinsheet section is disposed adjacent a respective one of the plurality of structural channels, such that the drum is defined by the adjacent plurality of skinsheet sections and the plurality of structural channels;
   wherein for each of the respective clamps of the plurality of clamps, the base is attached to and within the respective one of the plurality structural channels and the bail is within the respective one of the plurality structural channels, and wherein the draw extends from within the respective one of the plurality of structural channels to outside the respective one of the plurality of structural channels, and wherein the skinsheet clamp bar is outside the respective one of the plurality of structural channels, such that when the respective clamp is in the clamping position, the at least a portion of the skinsheet clamp bar holds a respective one of the plurality of skinsheet sections to the respective one of the plurality of structural channels in an operating position, and when the respective clamp is in the release position, the at least a portion of the skinsheet clamp bar allows the respective one of the plurality of skinsheet sections to move away from the respective one of the plurality of structural channels in a cleaning position.

2. The rotary drum blancher/cooler of claim 1, wherein the bail of each of the plurality of clamps is connected to the base using at least two linkage pins, and wherein the bail has a first position that places the clamp in the clamping position, and a second position that places the clamp in the release position.

3. The rotary drum blancher/cooler of claim 2, wherein the bail of each of the plurality of clamps is moveable between the first position and the second position without the use of a wrench.

4. The rotary drum blancher/cooler of claim 2, wherein the draw of each of the plurality of clamps is connected to the bail using at least one pin, wherein when the bail is in the first position the draw extends outside of the respective one of the plurality of structural channels a first distance, and when the bail is in the second position the draw extends outside of the respective one of the plurality of structural channels a second distance, and wherein the first distance is different than the second distance.

5. The rotary drum blancher/cooler of claim 2, wherein the draw of each of the plurality of clamps extends through a hole in a side wall of the respective one of the plurality of structural channels.

6. The rotary drum blancher/cooler of claim 5, wherein each of the of the plurality of skinsheets includes a side wall extending away from a surface of the drum, and wherein the at least a portion of the skinsheet clamp bar of each of the plurality of clamps holds respective side wall to the respective one of the plurality of structural channels when the respective one of the plurality of clamps is in the clamping position.

7. The rotary drum blancher/cooler of claim 6, wherein each of the plurality of structural channels includes more than one clamp base attached thereto.

8. The rotary drum blancher/cooler of claim 6, wherein the base of each of the respective clamps of the plurality of clamps is welded to the respective one of the plurality structural channels.

9. The rotary drum blancher/cooler of claim 5, wherein each of the respective clamps of the plurality of clamps is a clean in place clamp.

10. The rotary drum blancher/cooler of claim 2, wherein each of the respective clamps of the plurality of clamps is a totally removable clamp.

11. A clamp for a rotary drum blancher/cooler for processing food having a drum, wherein the drum comprises, a skinsheet, comprised of a plurality of sections, a plurality of structural channels, wherein each skinsheet section is adjacent a structural channel, such that the drum is at least partially defined by the adjacent plurality of skinsheet sections and the plurality of structural channels, wherein the adjacent skinsheet sections and structural channels are held together by the clamp, the clamp comprising:

a clamp base, attached to and within a respective one of the plurality of structural channels;

a bail connected to the clamp base and within the respective one of the plurality structural channels;

a draw connected to the bail, wherein the draw extends from within the respective one of the plurality of structural channels to outside the respective one of the plurality of structural channels; and at least a portion of a skinsheet clamp bar, wherein the draw extends through the at least a portion of the skinsheet clamp bar, and wherein the skinsheet clamp bar is disposed outside the respective one of the plurality of structural channels, such that when the clamp is in a clamping position the at least a portion of the skinsheet clamp bar holds a respective one of the plurality of skinsheet sections to the respective one of the plurality of structural channels in an operating position, and when the clamp is in a release position the at least a portion of the skinsheet clamp bar allows the respective one of the plurality of skinsheet sections to move away from the respective one of the plurality of structural channels in cleaning position.

12. The clamp of claim 11, wherein the bail is connected to the base using at least two linkage pins, and wherein the bail has a first position that places the clamp in the clamping position and a second position that places the clamp in the release position.

13. The clamp of claim 12, wherein the bail may be moved between the first position and the second position without the use of a wrench.

14. The clamp of claim 13, wherein the draw is connected to the bail using at least one pin, wherein when the bail is in the first position the draw extends outside of the respective one of the plurality of structural channels a first distance, and when the bail is in the second position the draw extends outside of the respective one of the plurality of structural channels a second distance, and wherein the first distance is different than the second distance.

15. The clamp of claim 14, wherein the draw extends through a hole in a side wall of the respective one of the plurality of structural channels.

16. The clamp of claim 15, wherein the base is welded to the respective one of the plurality structural channels.

17. The clamp of claim 11 wherein the clamp is a clean in place clamp.

18. The clamp of claim 11 wherein the clamp is a totally removable clamp.

* * * * *